United States Patent
McAllister et al.

(10) Patent No.: US 8,271,469 B2
(45) Date of Patent: Sep. 18, 2012

(54) METHOD AND SYSTEM FOR A NON-HIERARCHICAL TRACE SYSTEM USING A HIERARCHICAL CONTROL INTERFACE

(75) Inventors: Cameron James McAllister, Chandlers Ford (GB); Philip Richard Taunton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/288,924

(22) Filed: Nov. 3, 2011

(65) Prior Publication Data

US 2012/0054558 A1 Mar. 1, 2012

Related U.S. Application Data

(62) Division of application No. 10/943,054, filed on Sep. 16, 2004.

(51) Int. Cl.
*G06F 7/00* (2006.01)
*G06F 17/30* (2006.01)
(52) U.S. Cl. ........................ 707/705; 707/609
(58) Field of Classification Search .................. 707/705, 707/609
See application file for complete search history.

(56) References Cited

U.S. PATENT DOCUMENTS

| | | | | |
|---|---|---|---|---|
| 6,202,199 | B1 * | 3/2001 | Wygodny et al. | 717/125 |
| 6,282,701 | B1 * | 8/2001 | Wygodny et al. | 717/125 |
| 2002/0073063 | A1 * | 6/2002 | Faraj | 707/1 |
| 2002/0078264 | A1 * | 6/2002 | Eberhard | 710/1 |
| 2003/0159133 | A1 * | 8/2003 | Ferri et al. | 717/130 |

* cited by examiner

*Primary Examiner* — Apu Mofiz
*Assistant Examiner* — Jared Bibbee
(74) *Attorney, Agent, or Firm* — Steven M. Greenberg, Esq.; Carey, Rodriguez, Greenberg & O'Keefe

(57) ABSTRACT

A method and system for tracing components in computer applications is provided in which trace data from components can be logged in real time. A hierarchical control interface 209 is used in which leaf nodes 306-311 represent components 204 being traced. The hierarchical control interface 209 includes means for setting trace levels for components 204 being traced. A non-hierarchical trace system 210 is used for carrying out the trace processing and includes means 320 for storing trace level settings received from the hierarchical control interface 209. The trace system 210 also includes means 322 for receiving a call from a component 204 with trace data; means for checking the trace level settings 321 for the component 204; and means for storing or discarding the trace data accordingly.

9 Claims, 5 Drawing Sheets

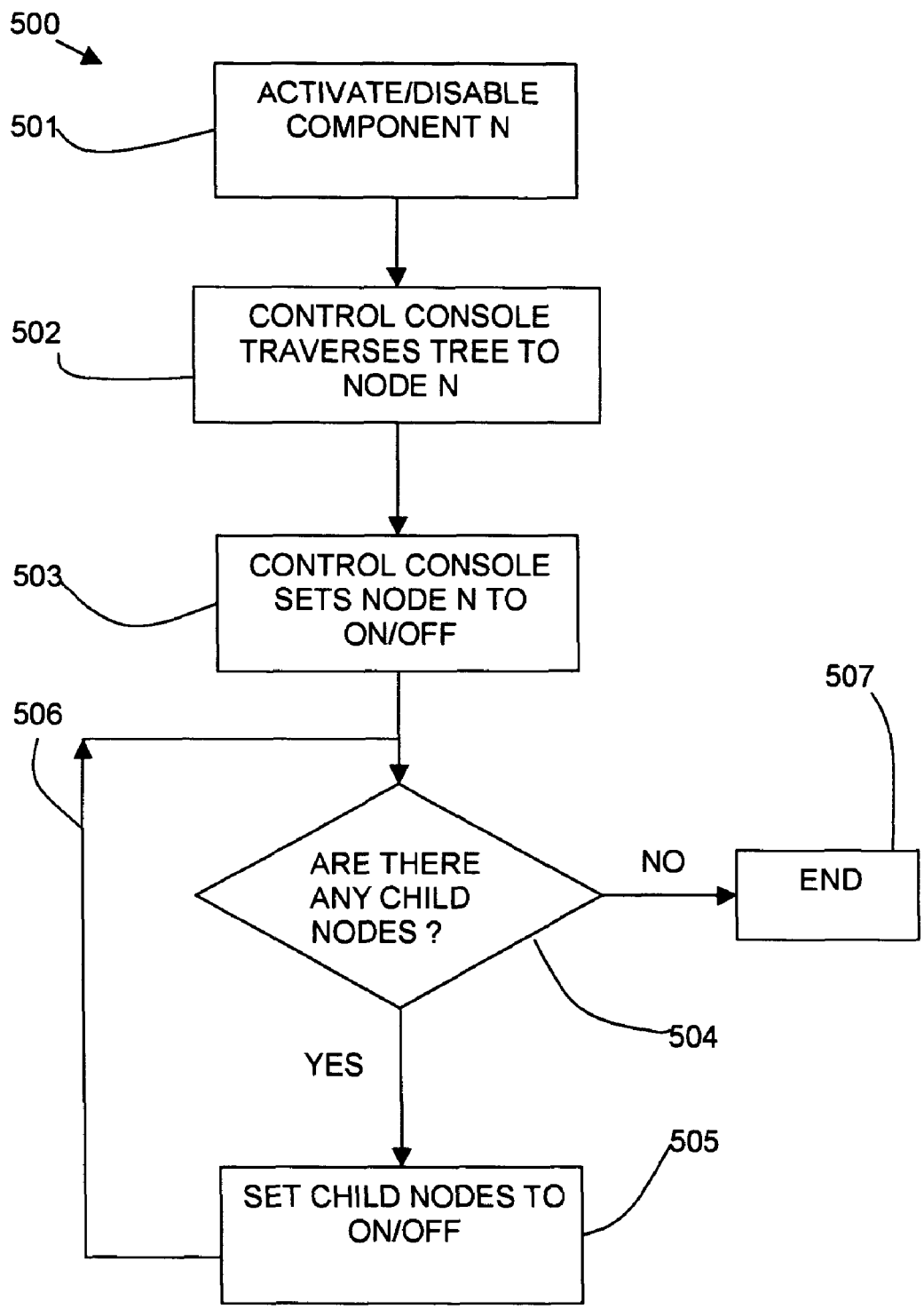

METHOD AND SYSTEM FOR A NON-HIERARCHICAL TRACE SYSTEM USING A HIERARCHICAL CONTROL INTERFACE

CROSS-REFERENCE TO RELATED APPLICATIONS

This is a divisional application of U.S. application Ser. No. 10/943,054, filed Sep. 16, 2004, entitled "METHOD AND SYSTEM FOR A NON-HIERARCHICAL TRACE SYSTEM USING A HIERARCHICAL CONTROL INTERFACE," the entirety of which is incorporated herein by reference.

TECHNICAL FIELD

This invention relates to the field of tracing components of computer applications in a computer system. In particular, this invention relates to tracing data from components in real time in a computer system.

BACKGROUND OF THE INVENTION

Software tools are used to monitor and analyse the execution of computer applications on a computer system. The form of monitoring may vary from logging occasional messages to logging every step of an computer program for evaluation. This can be very processor intensive for the processor on which the software tool is running. It is also necessary to trace the logging messages to the components of the system being monitored in order to obtain a complete picture of the performance of the system.

It is particularly beneficial, to log messages and trace the messages to components in real time as the system is running in order to take necessary action immediately to address any issues demonstrated by the logging. Run time logging and tracing requires even more processor performance.

A Java logging application programming interface (API) (Java is a trade mark of Sun Corporation) is provided in the Java platform to facilitate software servicing and maintenance at customer sites.

The Java logging API enables a Java program application, servlet, applet, EJB (Enterprise Java Bean), etc to produce messages which are collected as log reports. The log reports can be used for analysis by, for example, end users, system administrators, field service engineers, and software development teams. The log reports capture information such as security failures, configuration errors, performance bottlenecks, and/or bugs in the application or platform. This is a very user friendly and flexible logging API.

Java Specification Request JSR-47 is a logging API specification provided in the Java package java.util.logging in Java virtual machine (JVM) versions 1.4 onwards. The package java.util.logging has various interfaces and classes of objects including a logger class of objects.

Software components in a system which is being logged send messages to logger objects in the logging API. The logger objects are virtual components that represent the software components in the applications being logged. The messages are either accepted or discarded by the logger object depending on the priority level of the log message. Logger objects are organised in a hierarchical namespace and child logger objects may inherit logging properties from their parents in the namespace. The hierarchical namespace is managed by a log manager.

The Java logging API is easy to interface with other applications such as control consoles and can allow the modification of filtering levels for any part of any branch of its hierarchical structure. However, it is too slow and impractical to trace logging messages through a system in real time.

The Java logging API uses an object-oriented method of controlling objects. A component being traced in a computer system has a record logged and pushed up the hierarchical tree to the root node of the tree which outputs the log record. This form of logging is very effective when logging occasional messages. However, when tracing a large number of log records, the system is very slow as it must check at each node in a branch of the tree hierarchical structure.

The hierarchical system used by the Java logging API has the disadvantage that it is very slow and highly impractical to trace data through it in a real time system. The central processing hit would be intolerably high. The reasons for this include the following:

It is string based, and string manipulations are slow in Java;
The trace calls are passed through the hierarchy of logical components to the root node, every time checking to see if it passed the check for that node; and
The hierarchy is maintained in namespace which itself is slow to use, and slow to find the next node.

It is an aim of the present invention to provide a tracing system and method that implements a hierarchical trace system interface whilst allowing a flat system to handle the tracing.

Enabling a flat, non-hierarchical system to handle the tracing provides the speed essential for a real time tracing system. However, a known hierarchical trace system interface, for example JSR-47, provides a lot of flexibility and user friendliness.

SUMMARY OF THE INVENTION

According to a first aspect of the present invention there is provided a method for tracing components in computer applications comprising: providing a non-hierarchical trace system; providing a hierarchical control interface in which leaf nodes represent components being traced; the hierarchical control interface setting trace levels for components being traced, the trace levels being stored in the trace system; the trace system: receiving a call from a component with trace data; checking the trace level for the component; and storing or discarding the trace data accordingly.

In one embodiment, the hierarchical control interface may be a Java logging API such as JSR-47. However, other hierarchical control interfaces may be used.

A user may interface with the hierarchical control interface to set trace levels. Preferably, a trace level set for a higher generation node in the hierarchical control interface is passed to all leaf nodes stemming from the higher generation node. The trace levels may be stored at the nodes of the hierarchical control structure as well as in the trace system.

A leaf node may call the trace system with the trace level for the component it represents. The leaf node may call trace level methods in the trace system and the trace level may be stored to an array.

Each component may have an identifying means by which the stored trace level is checked. The identifying means may have a corresponding textual description identifying the component.

According to a second aspect of the present invention there is provided a system for tracing components in computer applications comprising: a hierarchical control interface in which leaf nodes represent components being traced, the hierarchical control interface including means for setting trace levels for components being traced; a non-hierarchical trace system including means for storing trace level settings received from the hierarchical control interface; the trace system also including: means for receiving a call from a component with trace data; means for checking the trace level settings for the component; and means for storing or discarding the trace data accordingly.

The hierarchical control interface may include means for a user to interface with the hierarchical control interface to set trace levels. The hierarchical control interface may also include means for passing a trace level set for a higher generation node to all leaf nodes stemming from the higher generation node. The hierarchical control interface may include means for storing the trace levels at the nodes.

The hierarchical control interface may include means for a leaf node to call the trace system with the trace level for the component it represents. The trace system may include an interface with trace level methods called by the leaf nodes and an array in which the trace level settings are stored. The trace system may also include an interface with trace methods called by the components being traced.

Each component may have an identifying means by which the stored trace level is checked. The identifying means may have a corresponding textual description identifying the component.

According to a third aspect of the present invention there is provided a computer program product stored on a computer readable storage medium, comprising computer readable program code means for performing the steps of: providing a non-hierarchical trace system; providing a hierarchical control interface in which leaf nodes represent components being traced; the hierarchical control interface setting trace levels for components being traced, the trace levels being stored in the trace system; the trace system: receiving a call from a component with trace data; checking the trace level for the component; and storing or discarding the trace data accordingly.

Embodiments of the present invention will now be described, by way of examples only, with reference to the accompanying drawings.

BRIEF DESCRIPTION OF THE DRAWINGS

FIG. 5 is a flow diagram of a method of setting trace levels in accordance with the present invention.

DETAILED DESCRIPTION

Figure 1:
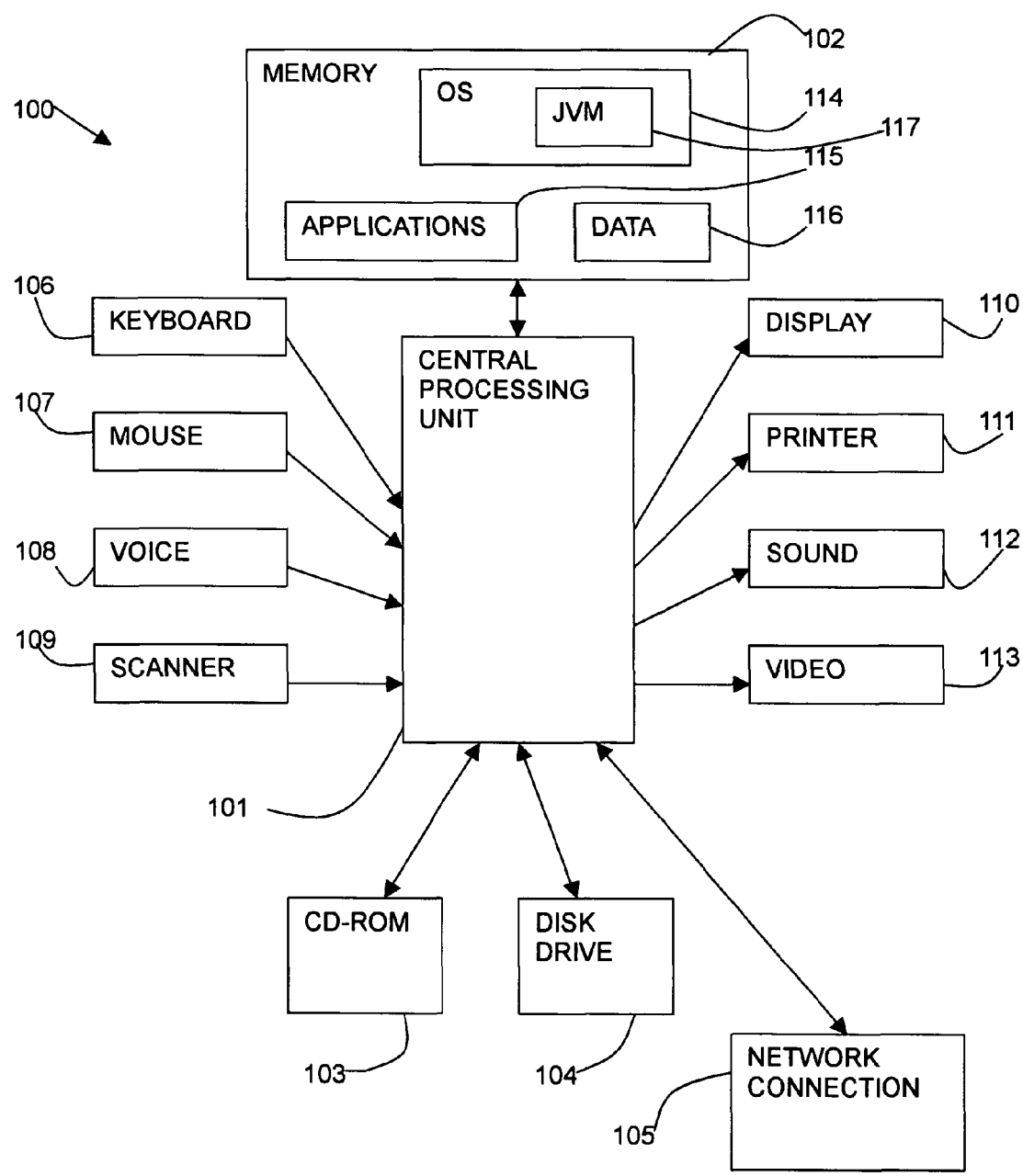
FIG. 1 is a block diagram of a computer system on which the present invention may be implemented.

Referring to FIG. 1, a computer system 100 is shown as an example of a system on which the present invention may be implemented. A computer system 100 has a central processing unit 101 with primary storage in the form of memory 102 (RAM and ROM). The memory 102 stores program information 114, 115 and data 116 acted on or created by the programs. The program information includes the operating system code for the operating system 114 of the computer system 100 and application code for applications 115 running on the computer system 100. Secondary storage includes optical disk storage 103 and magnetic disk storage 104. Data and program information can also be stored and accessed from the secondary storage.

The computer system 100 includes a network connection means 105 for interfacing the computer system 100 to a network such as a local area network (LAN) or the Internet. The computer system 100 may also have other external source communication means such as a fax modem or telephone connection.

The central processing unit 101 includes inputs in the form of, as examples, a keyboard 106, a mouse 107, voice input 108, and a scanner 109 for inputting text, images, graphics or the like. Outputs from the central processing unit 100 may include a display means 110, a printer 111, sound output 112, video output 113, etc.

In a distributed system, a computer system 100 as shown in FIG. 1 may be connected via a network connection 105 to a server on which applications may be run remotely from the central processing unit 101 which is then referred to as a client system.

A Java virtual machine (JVM) 117 can be provided supported by the operating system 114 of the computer system 100. A JVM 117 is a computer program that simulates the operation of components in a computer system.

A computer system 100 may be monitored in order to evaluate the performance of components within the system 100. A monitoring tool may be in the form of a software tool which monitors the performance of components in a computer system such as that shown in FIG. 1. The monitoring tool may be local to the computer system 100 or may operate via a network connection, for example from a server monitoring one or more client computer systems. The components may be software components which send log messages to the monitoring tool which traces the log messages to the components for analysis.

A JVM 117 supports APIs including a Java logging API for monitoring components of a computer system. Java Specification Request JSR-47 is a logging API specification provided in the Java package java.util.logging in Java virtual machine (JVM) versions 1.4 onwards. The package java.util.logging has various interfaces and classes of objects including: ConsoleHandler, FileHandler, Filter, Formatter, Handler, Level, Logger, LoggingPermission, LogManager, LogRecord, MemoryHandler, SimpleFormatter, SocketHandler, StreamHandler, XMLFormatter.

Components in a system which is being logged send messages to logger objects in the logging API. The logger objects are virtual components that represent the software components in the system being monitored.

The messages are either accepted or discarded by the logger object depending on the logger level designated for that logger object. The logger level is a priority level system ranging from severe for extremely important messages to finest for messages with the greatest detail. Each logger object can be set to accept messages at a required level. Each log message also has an associated log level. The level gives a guide to the importance and urgency of the log message.

Logger objects are organised in a hierarchical namespace and child logger objects may inherit logging properties such as the levels from their parents in the namespace. The logger objects allocate log record objects which are passed to handler objects for publication. Handler objects may filter and format a log record before publishing it to an I/O stream.

System components send log request messages to logger objects. Each logger object keeps track of a log level that it is interested in and discards log requests below this level. Logger objects are named entities in a hierarchical namespace which is managed by a LogManager.

The described method and system of tracing implement a hierarchical trace system interface such as that of the Java logging API, JSR-47 whilst allowing another, flat trace system to handle the tracing. Each component being monitored is represented by both a name and a number and can have its trace level determined individually. The components are not provided in a hierarchy and therefore logical groups of components can only have a trace function turned on individually.

The trace system maps components to be traced from a flat structure to the hierarchical structure of the known trace system interface. The method of modifying trace levels provided by the known trace system interface is implemented but instead of storing the trace level locally for a branch of the hierarchical structure, the trace level is passed to the leaf nodes descendent from the node in the hierarchical structure corresponding to the component.

Figure 2:
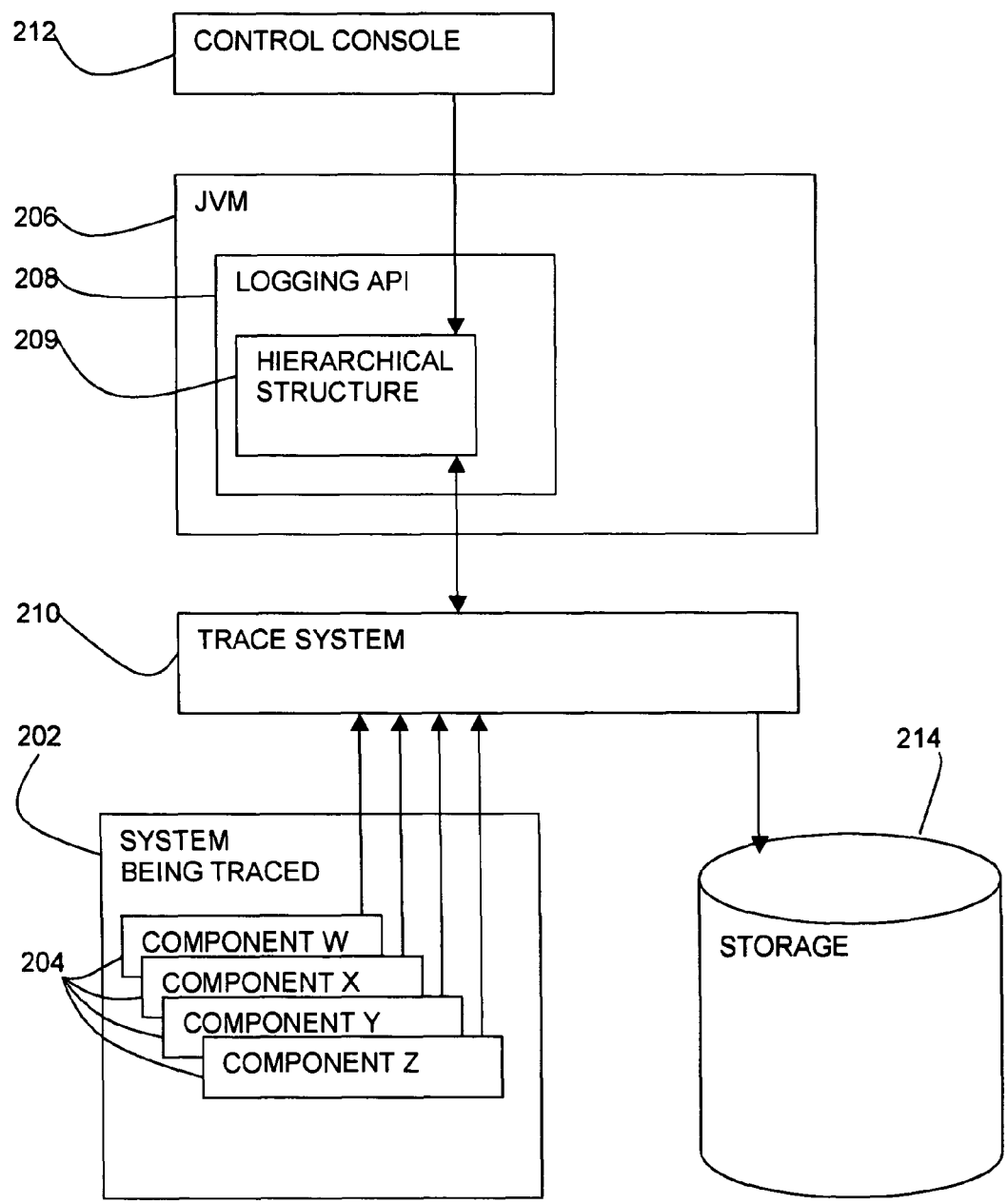
FIG. 2 is a block diagram of a trace system in accordance with the present invention.

Referring to FIG. 2, an arrangement is shown which includes a system 202 being traced having a plurality of components 204. A Java virtual machine 206 supports a logging API 208 with a hierarchical virtual component structure 209. A trace system 210 is provided which maps the components 204 of the system 202 being traced to the hierarchical structure 209 of the logging API 208.

Log messages sent from the components 204 of the system 202 being traced are accepted or discarded according to a logging level and accepted messages are output, for example to a storage means 214.

A known object-oriented hierarchical logging API 208 is used as described above, this provides logger objects in the form of a hierarchical namespace. Each logger object has a level of log record that is accepted for that object. This level can be set by a control console 212. If the log record falls within the acceptable level, the log record is output, for example by storing it to storage means 214. If the log record falls without the acceptable level, the log record is discarded.

The trace system 210 uses the hierarchical logging API 208 as a control system and implements its methods for modifying trace levels. The trace system 210 maps the components 204 of the system 202 being traced by name and number onto the leaf nodes of the hierarchical structure 209 of the logging API 208.

A system 202 being traced will not see the hierarchical logging API 208, instead it will trace directly to the trace system 210. However, all the control of the tracing will be handled by the hierarchical logging API 208 which provides an effective and efficient user interface.

Figure 3:
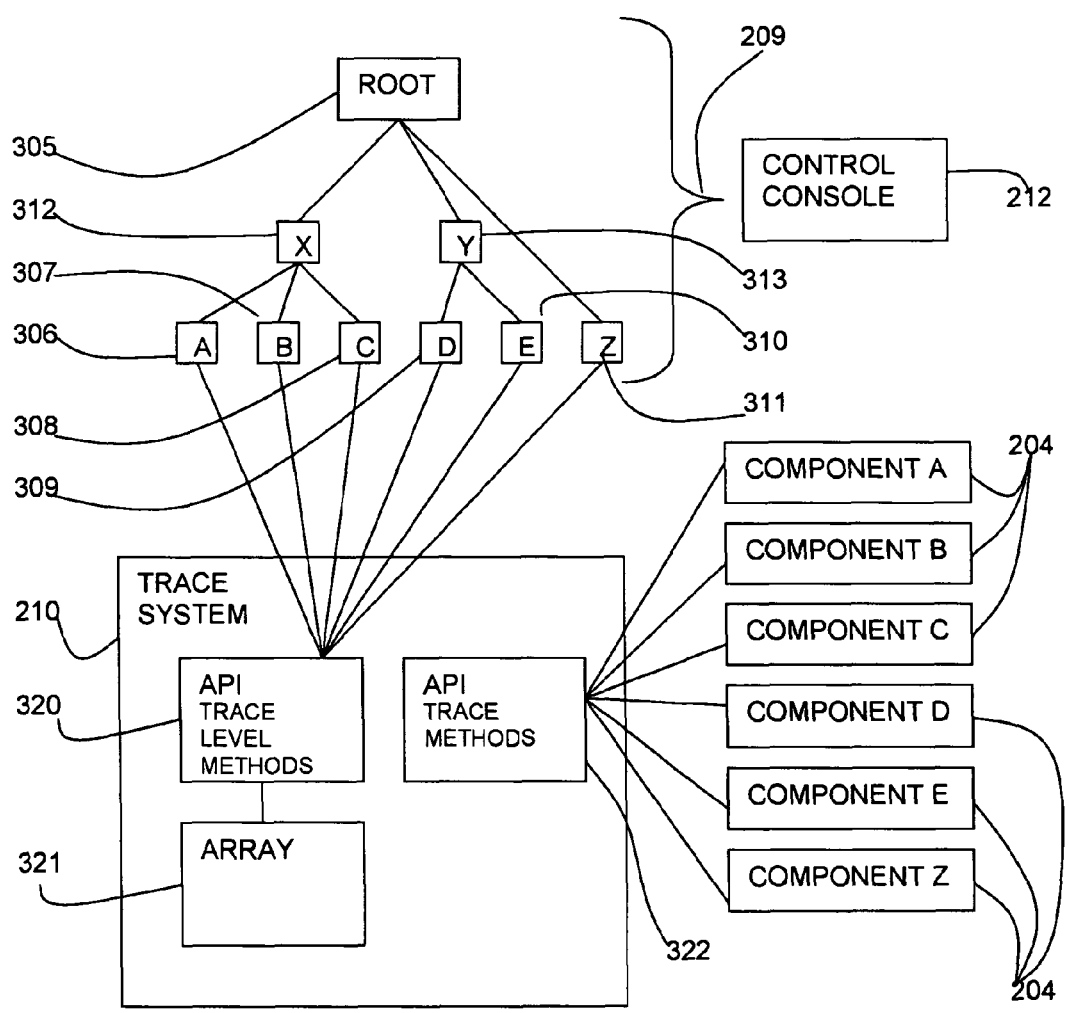
FIG. 3 is a more detailed schematic block diagram of the system of FIG. 2.

Referring to FIG. 3, a schematic diagram is shown in which a plurality of the components 204 of the system being traced are shown. Each component 204 may issue log requests in the form of log messages to the trace system 210.

The logging API includes a hierarchical structure 209 of virtual components. The hierarchical structure 209 has a root node 305 with branches of nodes. Each branch may have any number of generations of child nodes extending along it (for example, nodes X and Y 312, 313). Each branch is terminated at a leaf node 306, 307, 308, 309, 310, 311. Each leaf node 306, 307, 308, 309, 310, 311 in the hierarchical structure 209 of the logging API represents a component 204 being traced.

Each component 204 being traced has a designated acceptance level for logging records of messages sent from that component 204. The acceptance level may be as simple as on/off for logging records or may include a range of levels of priority corresponding to a level identified in the message. The acceptance level for each component 204 is provided in the hierarchical structure 209 at the leaf node 306, 307, 308, 309, 310, 311 corresponding to the component 204 being traced.

A control console 212 is provided which controls the acceptance level states of the components 204. When a command to change the acceptance level for a component 204 is sent to the leaf node 306, 307, 308, 309, 310, 311, it stores the acceptance level state so that when the component 204 is traced, the trace system 210 knows to look at the leaf node 306, 307, 308, 309, 310, 311 to find the acceptance level for it.

The trace system 210 has a trace API of trace methods 322 that are called by the components 204. The trace system 210 also has a trace level API of trace level methods 320 to set the trace level for a component 204. The trace level method of the API 320 are called by the leaf nodes 306, 307, 308, 309, 310, 311 which represent the components 204 in the hierarchical structure 209.

When a user sets the trace level in a node of the hierarchical structure 209 by using the control console 212, the trace level is stored on the node itself and is also passed it down to the child nodes and further generations all the way to the leaf nodes. For example referring to FIG. 3, a trace level is set at node X 312 and passed down to child nodes A, B, C 306, 307, 308 which are leaf nodes.

When the trace level is received at a node which does not have any child nodes (for example, the leaf nodes 306, 307, 308, 309, 310, 311) then it calls the trace level API 320 on the trace system 210 to set the trace level for the component it represents to the level passed to it from above.

The trace system 210 has an array 321 which stores the trace level values received from the leaf nodes of the hierarchical structure. The array 321 is then directly looked at when components 204 trace to the trace system 210.

The trace system 210 does not know about the hierarchical structure 209. The hierarchical structure 209 knows about the trace system 210 and calls methods on it, but the trace system 210 does not know what is setting its trace level settings. This means that any control system could be used to set the trace level settings.

The hierarchical structure 209 stores the values of trace levels that have been set to it. This allows the control console 212 to interrogate it so that users can know what the values are currently set to. This is a standard feature of the logging API JSR-47 which in the described embodiment is used as the user interface.

In addition, the actual values of the trace level settings that are being checked against when the calls come through from the components 204 are stored in the array 321 within the trace system 210.

In the trace system 210, the components 204 are all defined with a textual name and a corresponding number ID. There are methods available that will retrieve the appropriate data when passed the other value.

Each class in a component 204 knows which component it belongs to. A developer writes in the name of the component it belongs to. When it is created, it uses this component name to look up the number ID by calling a method on the trace system 210. It stores this component number, and every time it traces to the trace system 210 it passes this number as part of the data being traced. This component number is then used to look up the trace level for that component 204 that is stored in the array 321 in the trace system 210 set by the hierarchical structure 209.

The trace acceptance level used in the trace system 210 for deciding whether or not to trace data for a component 204 is reflected in the logging API 208. Therefore, if a known logging API 208 such as JSR-47 is used, the following changes are needed.

The loggers are the classes that are created to make the hierarchy of components 209. However, they only work with the logging API 208 defined within java.util.logging. As the described system has a different way of setting the trace levels (i.e. with a binary method) and the hierarchical structure is not being used to write data to disk, then new classes are written that inherit the methods defined in JSR-47 and change them to suit the described system.

The modified logging API 208 has a modified logger class in which the get/setLevel methods and the Log( . . . ) methods pass the trace levels down to its leaf nodes, or if it is itself a leaf node, then stores that data somewhere safe. Also, easy access to the trace level must be provided to allow the trace system 210 to query leaf nodes about it.

The logger class is also extended to allow for the trace system's 210 acceptance levels to be supported. The LogManager class is extended to allow the use of custom loggers.

The following are some examples which illustrate the described method and system for tracing components 204 shown in FIG. 3.

EXAMPLE 1

All components 204 are to be set to be on full trace.

The control console 212 which can navigate through the hierarchical structure 209 sets the root node 305 to be on full trace.

The root node 305 then passes this down through the hierarchical structure 209 to all its children (X, Y, Z, 312, 313, 311) and they pass it down to all their children (A, B, C, D, E, 306, 307, 308, 309, 310), and so on, until all the nodes are set to on.

The leaf nodes (A, B, C, D, E, Z, 306, 307, 308, 309, 310, 311) then call the trace system 210 telling it the trace level that has been set for that component 204. This trace level is stored in the array 321 for later reference.

EXAMPLE 2

Continuing from Example 1, component A 204 wants to trace some data.

Component A 204 passes its trace message to the trace system 210.

The trace system 210 (knowing the message is from component A) then looks up component A in the array 321 to see if that trace is to be stored to disk or to be discarded. As component A is set to on, then the trace message is stored to disk.

EXAMPLE 3

Continuing from Example 2, the super-component Y is to be disabled.

The control console 212 traverses the hierarchical structure 209 to find node Y 313. Node Y does not exist in the system being traced but it is the logical accumulation of components 204 D and E. The control console 212 then sets node Y 313 to off which then sets both nodes D and E, 309, 310 to off. Nodes D and E, 309, 310 call the trace system 210 which passes the trace levels for these components to the array 321.

EXAMPLE 4

Continuing from Example 3, component D 204 wants to trace some data.

The trace system 210 (knowing that the message is from component D) looks at the array 321 storing the trace level settings to see if that trace is to be stored to disk or not. As component D 204 is now set to off, the trace message is not stored to disk.

Figure 4:
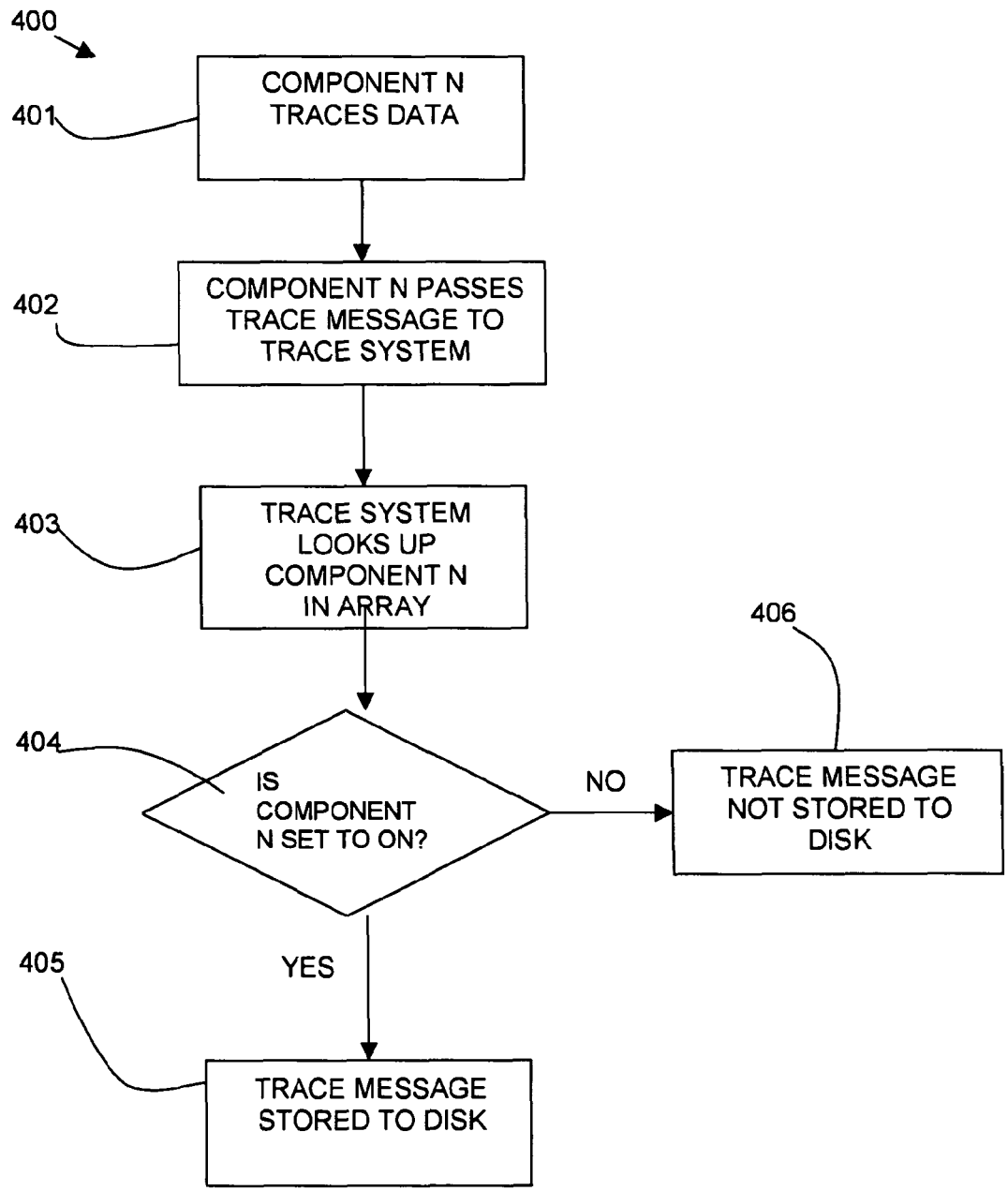
FIG. 4 is a flow diagram of a method of tracing data in accordance with the present invention.

A flow diagram of the method of tracing data 400 is shown in FIG. 4. Component N traces some data 401 and passes the trace message to the trace system 402. The trace system looks up 403 component N in the array. It is determined 404 if the trace message is to be stored or not. This determination may be to ascertain if a trace is on or off. However, the determination 404 may be based on acceptance levels for tracing in which a priority level of a message must be compared with the acceptance level associated with component N.

If the determination 404 is positive, the trace message is stored to disk 405. If the determination 404 is negative, the trace message is not stored to disk 406 and is ignored or discarded.

A flow diagram of the method of setting a trace to on or off 500 is shown in FIG. 5. A command to activate or disable traces for component N 501 is input from the control console. The control console traverses 502 the hierarchical structure to node N. The control console sets node N to on/off 503.

It is then determined 504 if there are one or more child nodes stemming from node N. If there are child nodes, the child nodes are also set to on/off 505 to conform with node N. The method loops 506 to determine 504 if there is a further generations of child nodes which in turn need to be set to conform with node N. When it is determined 504 that there are no more child nodes, the method ends 507.

The described method and system enable components of a system being monitored to be traced in real time. A hierarchical tracing system interface is used to control a more powerful flat tracing system.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. A system for tracing components in computer applications, comprising:
 a processor configured to include
  a non-hierarchical trace system for receiving calls with trace data from a plurality of components of a system being traced; and
  a hierarchical control interface coupled to the non-hierarchical trace system and controlling a hierarchical structure having nodes representing the plurality of components of the system being traced, wherein
  the non-hierarchical trace system receives calls from leaf nodes of the hierarchical structure to set trace levels for the components and determines whether to store trace data received from a component based on a trace level set for the component.

2. The system of claim 1, wherein the hierarchical control interface enables a user to set trace levels.

3. The system of claim 2, wherein the hierarchical control interface passes a trace level set for a higher generation node to all leaf nodes stemming from the higher generation node.

4. The system of claim 1, further comprising a storage array coupled to the non-hierarchical trace system and storing settings of trace levels.

5. The system of claim 4, wherein each of the components includes an identifier and a trace level of each of the components is associated with the identifier.

6. The system of claim 1, the nodes store settings of the trace levels.

7. The system of claim 1, wherein a leaf node of the hierarchical structure calls the non-hierarchical trace system with a trace level for a corresponding node of the leaf node.

8. The system of claim 1, wherein the non-hierarchical trace system includes an interface with trace level methods called by leaf nodes of the hierarchical structure.

9. The system of claim 1, wherein the non-hierarchical trace system includes an interface with trace methods called by the components being traced.

* * * * *